United States Patent
Gizaw et al.

(10) Patent No.: US 10,364,406 B2
(45) Date of Patent: Jul. 30, 2019

(54) HARD SURFACE CLEANERS

(71) Applicant: The Procter & Gamble Company, Cincinnati, OH (US)

(72) Inventors: Yonas Gizaw, West Chester, OH (US); Roy Jerome Harrington, Liberty Township, OH (US); Peter Herbert Koenig, Montgomery, OH (US); Nicola John Policicchio, Mason, OH (US); Stefano Scialla, Strombeek-bever (BE); Steven Daryl Smith, Fairfield, OH (US); Matthew Scott Wagner, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 98 days.

(21) Appl. No.: 15/729,712

(22) Filed: Oct. 11, 2017

(65) Prior Publication Data

US 2018/0100125 A1  Apr. 12, 2018

Related U.S. Application Data

(60) Provisional application No. 62/406,436, filed on Oct. 11, 2016.

(30) Foreign Application Priority Data

Jun. 23, 2017 (EP) .................................. 17177674

(51) Int. Cl.
| | | |
|---|---|---|
| *C11D 3/37* | (2006.01) | |
| *A47L 13/17* | (2006.01) | |
| *C11D 1/825* | (2006.01) | |
| *C09D 133/24* | (2006.01) | |
| *C11D 3/00* | (2006.01) | |
| *C11D 3/43* | (2006.01) | |
| *C11D 3/48* | (2006.01) | |
| *C11D 17/04* | (2006.01) | |
| *C11D 1/72* | (2006.01) | |
| *C11D 1/75* | (2006.01) | |

(52) U.S. Cl.
CPC ............ *C11D 3/3773* (2013.01); *A47L 13/17* (2013.01); *C09D 133/24* (2013.01); *C11D 1/825* (2013.01); *C11D 3/0036* (2013.01); *C11D 3/3742* (2013.01); *C11D 3/3769* (2013.01); *C11D 3/43* (2013.01); *C11D 3/48* (2013.01); *C11D 17/049* (2013.01); *C11D 1/72* (2013.01); *C11D 1/75* (2013.01)

(58) Field of Classification Search
CPC ........................... C11D 3/3769; C11D 3/3773
USPC ......................................................... 510/475
See application file for complete search history.

(56) References Cited

U.S. PATENT DOCUMENTS

| | | | |
|---|---|---|---|
| 4,889,887 A | 12/1989 | Fan et al. | |
| 4,959,432 A | 9/1990 | Fan et al. | |
| 5,251,849 A | 10/1993 | Torres | |
| 6,482,793 B1 | 11/2002 | Gordon et al. | |
| 6,551,985 B1 | 4/2003 | Bianchetti et al. | |
| 7,671,007 B2 | 3/2010 | Carnali et al. | |
| 7,723,453 B2 | 5/2010 | Carnali et al. | |
| 2006/0276371 A1 | 12/2006 | Schreiner | |
| 2011/0009309 A1* | 1/2011 | Mertens | C11D 3/3776 510/400 |
| 2012/0171267 A1 | 7/2012 | Cunningham et al. | |
| 2018/0371377 A1* | 12/2018 | Sherry | C11D 3/3757 |

FOREIGN PATENT DOCUMENTS

| | | |
|---|---|---|
| EP | 1362907 A2 | 11/2003 |
| EP | 2 039 747 A1 | 3/2009 |
| EP | 2 039 748 A1 | 3/2009 |
| WO | WO9927058 A1 | 6/1999 |
| WO | WO2012010700 A1 | 1/2012 |

OTHER PUBLICATIONS

International Search Report; International Application No. PCT/US2017/056017; dated Jan. 3, 2018; 14 pages.

* cited by examiner

*Primary Examiner* — Gregory E Webb
(74) *Attorney, Agent, or Firm* — John T. Dipre

(57) ABSTRACT

Liquid hard surface cleaning composition comprising: a hydrophobically modified cationic polymer, in combination with a detersive surfactant, solvent, or mixtures thereof, provide less residues on the surface, less spotting of the surface after treatment, and improved maintenance of surface shine such that less cleaning frequency is needed.

17 Claims, No Drawings

HARD SURFACE CLEANERS

FIELD OF THE INVENTION

Hard surface cleaning compositions comprising hydrophobically modified cationic polymer and their use in improving shine, by reducing smearing, reducing spotting on hard surfaces, and improving grease removal.

BACKGROUND OF THE INVENTION

Hard surface cleaning compositions are used for cleaning and treating hard surfaces. Preferably, the hard surface cleaning composition is formulated to be an "all purpose" hard surface cleaning composition. That is, the hard surface cleaning composition is formulated to be suitable for cleaning as many different kinds of surfaces as possible.

After cleaning hard surfaces, the user expects the treated surfaces to be shiny. Indeed, the relative shine is considered to be an indication of surface cleanliness. However, shine impression is reduced by the smearing of residues on the surface. Such residues can be residual oils, or even surfactant. In addition, residual spots on the surface significantly reduce the impression of surface shine. Moreover, by maintaining shine, less frequency of cleaning is needed. As such, a need remains for a hard surface cleaning composition which results in less residues on the surface, less spotting of the surface after treatment, and improved maintenance of surface shine such that less cleaning frequency is needed.

U.S. Pat. No. 6,482,793 relates to liquid hard-surface cleaning compositions comprising polyalkoxylene glycol containing polymers which provide next-time cleaning performance to the hard-surfaces. U.S. Pat. No. 4,889,887 relates to cross-linkable copolymers and gelable acid compositions containing them. The copolymers contain an N-(alkoxymethylene)acrylyl moiety, such as copolymers comprising acrylamide, methacrylamidopropyltrimethylammonium chloride (MAPTAC), and n-Butyl Methacrylate (nBMA) monomers. A hydrophobic modification can be applied to the cationic monomer. U.S. Pat. No. 4,959,432 relates to cationic, anionic and amphoteric polymers suitable for the preparation of acid viscosifier compositions and the acid viscosified compositions comprising them. The polymers are water soluble or water dispersible and are based on acrylyl monomers having the stated ionic charge. They are capable of viscosifying acid solutions for such uses as recovery of gas and oil from subterranean formations. U.S. Pat. No. 7,671,007 relates to personal care/personal wash compositions comprising hydrophobically modified cationic polymers for the deposition of benefit agents. U.S. Pat. No. 7,723,453 relates to hydrophobically modified cationic polymers for use as deposition aids for particles, including copolymers comprising methacrylamidopropyltrimethylammonium chloride (MAPTAC), and n-dodecyl methacrylamide (DMA), n-(n-octadecyl acrylamide) (ODA), n-tert-octylacrylamide (tOA), and the like. US20120171267A1 relates to antimicrobial compositions which include a carbonate/bicarbonate salt of a quaternary ammonium cation, an organic acid, hydrogen peroxide and a cationic polymer. The cationic polymer includes either a (3-acrylamidopropyl)trimethylammonium chloride monomer or a [2-(acryloyloxy)ethyl]trimethylammonium chloride monomer. The cationic polymer also includes another monomer selected from a polar, water soluble monomer, a hydrophobic, silicone-containing monomer or mixtures of both types of monomers in combination with one of the trimethylammonium chloride monomers. EP2039747 relates to a process of treating a hard surface with a composition comprising polyalkoxylate trisiloxane, specifically to a process of treating a horizontal hard surface. EP2039748 A1 relates to a process of treating a hard surface with a composition comprising polyalkoxylate trisiloxane, specifically to a process of treating an inclined or vertical hard surface.

U.S. Pat. No. 6,551,985 B1 relates to a liquid acidic composition having a sulfamic acid, a second acid, and an acid-stable polymer selected from the group consisting of a sulphonated polystyrene polymer, a vinylpyrrolidone homopolymer or copolymer, and mixtures thereof, to remove limescale-containing stains from a hard-surface.

SUMMARY OF THE INVENTION

The present invention relates to a liquid hard surface cleaning composition comprising: a hydrophobically modified cationic polymer, in combination with a detersive surfactant, solvent, or mixtures thereof.

DETAILED DESCRIPTION OF THE INVENTION

Hard surface cleaning compositions of the present invention, comprising a hydrophobically modified cationic polymer have been found to result in lower surface residues, less spotting, and hence an improved shine impression, even in the presence of only low levels of surfactant or solvent, or mixtures thereof. The compositions of the present invention have been found to reduce grease attachment onto the treated hard surface, prevent soap-scum spotting on hard surfaces, and combinations thereof.

The compositions of the present invention provide longer lasting surface cleanliness and especially shine. Without being bound by theory, it is believed that the hard surface cleaning composition make the surface less sticky for dirt, such as greasy soap scum, resulting in both improved next time cleaning and less cleaning frequency.

As defined herein, "essentially free of" a component means that no amount of that component is deliberately incorporated into the respective premix, or composition. Preferably, "essentially free of" a component means that no amount of that component is present in the respective premix, or composition.

As used herein, "isotropic" means a clear mixture, having little or no visible haziness, phase separation and/or dispersed particles, and having a uniform transparent appearance.

As defined herein, "stable" means that no visible phase separation is observed for a premix kept at 25° C. for a period of at least two weeks, or at least four weeks, or greater than a month or greater than four months, as measured using the Floc Formation Test, described in USPA 2008/0263780 A1.

All percentages, ratios and proportions used herein are by weight percent of the premix, unless otherwise specified. All average values are calculated "by weight" of the premix, unless otherwise expressly indicated.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

Liquid Hard Surface Cleaning Compositions:

By "liquid hard surface cleaning composition", it is meant herein a liquid composition for cleaning hard surfaces found, for example, in households, especially domestic households. Surfaces to be cleaned include kitchens and bathrooms, e.g., floors, walls, tiles, windows, cupboards, sinks, showers, shower plastified curtains, wash basins, WCs, fixtures and fittings, and the like made of different materials like ceramic, vinyl, no-wax vinyl, linoleum, melamine, glass, steel, kitchen work surfaces, any plastics, plastified wood, metal, wood such as wood floors and wood furniture, or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments. Other surfaces to be cleaned include automobile surfaces such as car glass and automobile bodies.

In a preferred embodiment, the liquid compositions herein are aqueous compositions. Therefore, they may comprise from 30% to 99.5% by weight of the total composition of water, preferably from 50% to 98% and more preferably from 80% to 97%.

For "all purpose" hard surface cleaning compositions, the pH is preferably from 7.0 to 12, more preferably from 7.5 to 11.5, even more preferably from 9.5 to 11.3, most preferably 10 to 11. It is believed that the greasy soil and particulate greasy soil cleaning performance is further improved at these preferred alkaline pH ranges. Accordingly, the compositions herein may further comprise an acid or base to adjust pH as appropriate.

For improved limescale removal, an acidic pH is preferred. Therefore such acidic hard surface cleaning compositions have a pH of less than 7. Preferably, the composition has a pH of from 1 to 6, more preferably from 2.0 to 4.0, still more preferably from 2.5 to 3.7, and most preferably from 2.1 to 2.4. The pH of the cleaning compositions is measured at 25° C. Typically, the acid system may comprise any organic or inorganic acid well-known to those skilled in the art, or a mixture thereof. In preferred embodiments, the acid system comprises acids selected from the group consisting of: citric acid, formic acid, acetic acid, maleic acid, lactic acid, glycolic acid, succinic acid, glutaric acid, adipic acid, sulphamic acid, sulphuric acid, hydrochloric acid, phosphoric acid, nitric acid, methane sulphonic acid, and mixtures thereof, preferably acids selected from the group consisting of: citric acid, formic acid, acetic acid, lactic acid, phosphoric acid, and mixtures thereof. Formic acid is particularly preferred as part of the acid system. Formic acid has been found to provide excellent limescale removal performance, in combination with improved surface safety, especially for surfaces which are prone to corrosion. The composition preferably comprises the acid system at a level of from 0.01% to 15%, preferably from 0.5% to 10%, more preferably from 2% to 8%, most preferably from 4% to 7.5% by weight of the total composition.

The acidic hard surface cleaning composition can also comprise an alkaline material, so long as the overall pH remains acidic. Examples of alkaline material are sodium hydroxide, potassium hydroxide and/or lithium hydroxide, and/or the alkali metal oxides such, as sodium and/or potassium oxide or mixtures thereof and/or monoethanolamine and/or triethanolamine. Other suitable bases include ammonia, ammonium carbonate, choline base, etc. Preferably, source of alkalinity is sodium hydroxide or potassium hydroxide, preferably sodium hydroxide. Typically the amount of alkaline material is of from 0.001% to 20% by weight, preferably from 0.01% to 10% and more preferably from 0.05% to 3% by weight of the composition.

A suitable acid for use herein is an organic and/or an inorganic acid. A preferred organic acid for use herein has a pKa of less than 6. A suitable organic acid is selected from the group consisting of: citric acid, lactic acid, glycolic acid, succinic acid, glutaric acid and adipic acid and mixtures thereof. A suitable inorganic acid can be selected from the group consisting of: hydrochloric acid, sulphuric acid, phosphoric acid and mixtures thereof.

A typical level of such acids, when present, is from 0.01% to 5.0% by weight of the total composition, preferably from 0.04% to 3.0% and more preferably from 0.05% to 1.5%.

A suitable base to be used herein is an organic and/or inorganic base. Suitable bases for use herein are the caustic alkalis, such as sodium hydroxide, potassium hydroxide and/or lithium hydroxide, and/or the alkali metal oxides such, as sodium and/or potassium oxide or mixtures thereof. A preferred base is a caustic alkali, more preferably sodium hydroxide and/or potassium hydroxide.

Other suitable bases include ammonia, ammonium carbonate, $K_2CO_3$, $Na_2CO_3$ and alkanolamines (such as monoethanolamine, triethanolamine, aminomethylpropanol, and mixtures thereof).

Typical levels of such bases, when present, are from 0.01% to 5.0% by weight of the total composition, preferably from 0.05% to 3.0% and more preferably from 0.1% to 2.0%.

All ratios are calculated as a weight/weight level, unless otherwise specified.

Hydrophobically Modified Cationic Polymer:

The liquid hard surface cleaning composition comprises a hydrophobically modified cationic polymer having the formula:

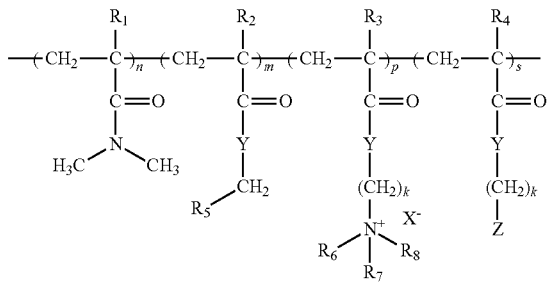

wherein:

n, m, p, and s are the mole percent of the respective monomers, such that:

n is from 80 to 99.5, preferably from 85 to 97, more preferably from 88 to 95;

m is from 0 to 10, preferably from 0.25 to 7, more preferably from 0.5 to 5;

p is from 0.25 to 20, preferably p is from 0.5 to 15, more preferably from 2 to 10;

s is from 0 to 10, preferably from 0.01 to 1, more preferably from 0.01 to 0.5; m+s is at least 0.01;

with the proviso that the sum of the mole percentages add up to 100%;

$R_1$, $R_2$, $R_3$, and $R_4$ are independently H or $CH_3$;

$R_5$ is an alkyl group from C7 to C21, preferably $R_5$ is an alkyl group from C16 to C20, more preferably C17;

$R_6$, $R_7$, $R_8$, are independently selected from the group consisting of: hydrogen and C1 to C4 alkyl;

$R_6$ is preferably H, and $R_7$, $R_8$, are preferably independently selected from the group consisting of: methyl, ethyl, and propyl;

Y is independently O or NH;

Z is silicone or a derivative thereof; Z can be a silicone or derivative selected from the group consisting of a polydimethylsiloxane, an aminosilicone, a cationic silicone, a silicone polyether, a cyclic silicone, a fluorinated silicone and mixtures thereof, preferably Z is polydimethylsiloxane;

can be a silicone or derivative having a molecular weight of from 250 to 40,000, preferably 500 to 20,000, more preferably 1,000 to 10,000 Da;

k is independently from 1 to 12, preferably from 2 to 8, more preferably from 2 to 5; and $X^-$ is an anion, preferably $Cl^-$, $Br^-$, $I^-$, $HSO_4^-$, $CH_3SO_4^-$, $C_2H_5SO_4^-$, or $OH^-$.

In preferred embodiments, m is at least 0.01, and s is 0.

The hydrophobically modified cationic polymer has a molecular weight of less than 1,500,000 Daltons, preferably from 100,000 to 500,000 Daltons.

Detersive Surfactant:

The liquid hard surface cleaning composition can comprise a detersive surfactant. Suitable detersive surfactants can be selected from the group consisting of: anionic surfactants, nonionic surfactants, amphoteric surfactants, zwitterionic surfactants, and mixtures thereof. Preferred detersive surfactants are: anionic surfactants, nonionic surfactants, and mixtures thereof.

The total amount of detersive surfactant can be present at a level of from 0.00025 wt % to 20 wt %, preferably from 0.002 wt % to 10 wt %, more preferably from 0.004 wt % to 4.0 wt %, most preferably from 0.01 wt % to 0.75 wt % of the composition.

Suitable nonionic surfactant can be selected from the group consisting of: alkoxylated nonionic surfactants, alkyl polyglycosides, amine oxides, and mixture thereof. Typically, the liquid hard surface cleaning composition may comprise from 0.00025 wt % to 15 wt % by weight of the total composition of said nonionic surfactant, preferably from 0.002 wt % to 7 wt %, more preferably from 0.004 wt % to 3.0 wt % and most preferably from 0.01 wt % to 0.65 wt %.

The hard surface cleaning composition can comprise from 0.00025 wt % to 10.0 wt % by weight of the total composition of alkoxylated alcohol, preferably ethoxylated alcohol, preferably from 0.0008 wt % to 5.0 wt %, more preferably from 0.0019 wt % to 1.0 wt % and most preferably from 0.0035 wt % to 0.5 wt %.

Suitable alkoxylated nonionic surfactants include primary $C_6$-$C_{16}$ alcohol polyglycol ether i.e. ethoxylated alcohols having 6 to 16 carbon atoms in the alkyl moiety and 4 to 30 ethylene oxide (EO) units. When referred to for example $C_{9-14}$ it is meant average carbons and alternative reference to for example EO8 is meant average ethylene oxide units.

Suitable alkoxylated nonionic surfactants are according to the formula $RO$-$(A)_nH$, wherein: R is a $C_6$ to $C_{18}$, preferably a $C_8$ to $C_{16}$, more preferably a $C_8$ to $C_{12}$ alkyl chain, or a $C_6$ to $C_{28}$ alkyl benzene chain; A is an ethoxy or propoxy or butoxy unit, and wherein n is from 1 to 30, preferably from 1 to 15 and, more preferably from 4 to 12 even more preferably from 5 to 10. Preferred R chains for use herein are the $C_8$ to $C_{22}$ alkyl chains. Even more preferred R chains for use herein are the $C_9$ to $C_{12}$ alkyl chains. R can be linear or branched alkyl chain.

Suitable ethoxylated nonionic surfactants for use herein are Dobanol® 91-2.5 (HLB=8.1; R is a mixture of $C_9$ and $C_{11}$ alkyl chains, n is 2.5), Dobanol® 91-10 (HLB=14.2; R is a mixture of $C_9$ to $C_{11}$ alkyl chains, n is 10), Dobanol® 91-12 (HLB=14.5; R is a mixture of $C_9$ to $C_{11}$ alkyl chains, n is 12), Greenbentine DE80 (HLB=13.8, 98 wt % C10 linear alkyl chain, n is 8), Marlipal 10-8 (HLB=13.8, R is a C10 linear alkyl chain, n is 8), Lialethl® 11-5 (R is a $C_{11}$ alkyl chain, n is 5), Isalchem® 11-5 (R is a mixture of linear and branched C11 alkyl chain, n is 5), Lialethl® 11-21 (R is a mixture of linear and branched $C_{11}$ alkyl chain, n is 21), Isalchem® 11-21 (R is a $C_{11}$ branched alkyl chain, n is 21), Empilan® KBE21 (R is a mixture of $C_{12}$ and $C_{14}$ alkyl chains, n is 21) or mixtures thereof. Preferred herein are Dobanol® 91-5, Neodol® 11-5, Lialethl® 11-21 Lialethl® 11-5 Isalchem® 11-5 Isalchem® 11-21 Dobanol® 91-8, or Dobanol® 91-10, or Dobanol® 91-12, or mixtures thereof. These Dobanol®/Neodol® surfactants are commercially available from SHELL. These Lutensol® surfactants are commercially available from BASF and these Tergitol® surfactants are commercially available from Dow Chemicals.

Suitable chemical processes for preparing the alkoxylated nonionic surfactants for use herein include condensation of corresponding alcohols with alkylene oxide, in the desired proportions. Such processes are well known to the person skilled in the art and have been extensively described in the art, including the OXO process and various derivatives thereof. Suitable alkoxylated fatty alcohol nonionic surfactants, produced using the OXO process, have been marketed under the tradename NEODOL® by the Shell Chemical Company. Alternatively, suitable alkoxylated nonionic surfactants can be prepared by other processes such as the Ziegler process, in addition to derivatives of the OXO or Ziegler processes.

Preferably, said alkoxylated nonionic surfactant is a $C_{9-11}$ EO5 alkylethoxylate, $C_{12-14}$ EO5 alkylethoxylate, a $C_{11}$ EO5 alkylethoxylate, $C_{12-14}$ EO21 alkylethoxylate, or a $C_{9-11}$ EO8 alkylethoxylate or a mixture thereof. Most preferably, said alkoxylated nonionic surfactant is a $C_{11}$ EO5 alkylethoxylate or a $C_{9-11}$ EO8 alkylethoxylate or a mixture thereof.

Alkyl polyglycosides are biodegradable nonionic surfactants which are well known in the art. Suitable alkyl polyglycosides can have the general formula $C_nH_{2n+1}O(C_6H_{10}O_5)_xH$ wherein n is preferably from 9 to 16, more preferably 11 to 14, and x is preferably from 1 to 2, more preferably 1.3 to 1.6. Such alkyl polyglycosides provide a good balance between anti-foam activity and detergency. Alkyl polyglycoside surfactants are commercially available in a large variety. An example of a very suitable alkyl poly glycoside product is Planteren APG 600, which is essentially an aqueous dispersion of alkyl polyglycosides wherein n is about 13 and x is about 1.4.

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 10 to 30 carbon atoms. Preferred amine oxide surfactants are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted linear or branched hydrocarbon chain. Preferably, the liquid hard surface cleaning composition comprises from 0.00025 wt % to 2.0 wt %, preferably from 0.0005 wt % to 1.0 wt %, more preferably from 0.001 wt % to 0.5 wt % and most preferably from 0.0025 wt % to 0.25 wt % of the composition of amine oxide surfactant.

A highly preferred amine oxide is $C_{12}$-$C_{14}$ dimethyl amine oxide, commercially available from Albright & Wilson, $C_{12}$-$C_{14}$ amine oxides commercially available under the trade name Genaminox® LA from Clariant or AROMOX® DMC from AKZO Nobel.

The nonionic surfactant is preferably a low molecular weight nonionic surfactant, having a molecular weight of less than 950 g/mol, more preferably less than 500 g/mol.

Preferably, the hard surface cleaning composition comprises less than 1.0 wt %, more preferably less than 0.2 wt %, even more preferably, less than 0.05 wt % of anionic surfactant. Most preferably, the hard surface cleaning composition is essentially free of, or free of, anionic surfactant. If used, suitable anionic surfactants include an alkyl sulphate, an alkyl alkoxylated sulphate, a sulphonic acid or sulphonate surfactant, and mixtures thereof.

The hard surface cleaning composition may comprise up to 3.0 wt % of an additional surfactant, preferably selected from: an amphoteric, zwitterionic, and mixtures thereof. More preferably, the hard surface cleaning composition can comprise from 0.005 wt % to 1.5 wt %, or from 0.001 wt % to 0.5 wt %, or from 0.0025 wt % to 0.25* wt % by weight of the additional surfactant.

Suitable zwitterionic surfactants typically contain both cationic and anionic groups in substantially equivalent proportions so as to be electrically neutral at the pH of use. The typical cationic group is a quaternary ammonium group, other positively charged groups like phosphonium, imidazolium and sulfonium groups can be used. The typical anionic hydrophilic groups are carboxylates and sulfonates, although other groups like sulfates, phosphonates, and the like can be used.

Some common examples of zwitterionic surfactants (such as betaine/sulphobetaine surfacants) are described in U.S. Pat. Nos. 2,082,275, 2,702,279 and 2,255,082. For example Coconut dimethyl betaine is commercially available from Seppic under the trade name of Amonyl 265®. Lauryl betaine is commercially available from Albright & Wilson under the trade name Empigen BB/L®. A further example of betaine is Lauryl-iminodipropionate commercially available from Rhodia under the trade name Mirataine H2C-HA®.

Sulfobetaine surfactants are particularly preferred, since they can improve soap scum cleaning. Examples of suitable sulfobetaine surfactants include tallow bis(hydroxyethyl) sulphobetaine, cocoamido propyl hydroxy sulphobetaines which are commercially available from Rhodia and Witco, under the trade name of Mirataine CBS® and ReWoteric AM CAS 15® respectively.

Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in U.S. Pat. No. 2,658,072, N-higher alkylaspartic acids such as those taught in U.S. Pat. No. 2,438,091, and the products sold under the trade name "Miranol", as described in U.S. Pat. No. 2,528,378. Other suitable additional surfactants can be found in McCutcheon's Detergents and Emulsifers, North American Ed. 1980.

Solvent:

The liquid hard surface cleaning composition can comprise a solvent, especially a non-aqueous solvent. The preferred solvents include propylene glycol n-butyl ether (dowanol PnB), tripropylene glycol methyl ether (dowanol TPM), dipropylene glycol n-propyl ether (dowanol DPnP), dipropylene glycol n-butyl ether (dowanol DPnB), tripropylene glycol n-butyl ether (dowanol TPnB), diethylene glycol n-butyl ether (Butyl carbitol), diethylene glycol hexyl ether (hexyl Carbitol), diethylene glycol n-butyl ether acetate (butyl carbitol acetate), ethylene glycol hexyl ether (hexyl cellosolve), triethylene glycol methyl ether (methoxytriglycol), triethylene glycol ethyl ether (ethoxytriglycol), triethylene glycol n-butyl ether (butoxytriglycol), Ucar filmer ibt, trimethylnonanol, propylene glycol diacetate (dowanol PGDA), dipropylene glycol methyl ether (dowanol DPM) mixtures thereof. Such solvents can be present at a level of from 0.005 wt % to 10 wt % by weight of the total composition of said solvent, preferably from 0.01 wt % to 7.0 wt %, more preferably from 0.025 wt % to 5.5 wt % and most preferably from 0.25 wt % to 3.0 wt %.

The combination of the solvent and hydrophobically modified cationic polymer results in a hard surface cleaning composition which is both low sudsing, and improves the loosening and removal of soils. It is believed that the combination of solvent and polymer also improves the distribution and deposition of the polymer onto the hard surface, and improves the wetting and emulsification of the soil off the treated surface.

Optional Ingredients:

Additional Polymers:

The liquid hard surface cleaning composition may comprise an additional polymer. It has been found that the presence of a specific polymer as described herein, when present, allows further improving the grease removal performance of the liquid composition due to the improved emulsification of the greasy soil. Suitable polymers for use herein are disclosed in co-pending EP patent application EP2272942 (09164872.5) and granted European patent EP2025743 (07113156.9).

The polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

The liquid hard surface cleaning composition may comprise from 0.001 wt % to 2.25 wt % by weight of the total composition of said polymer, preferably from 0.0025 wt % to 2.0 wt %, more preferably from 0.01 wt % to 1.75 wt % and most preferably from 0.05 wt % to 1.5 wt %.

Thickener:

The liquid hard surface cleaning composition can comprise a thickener. An increased viscosity, especially low shear viscosity, provides longer contact time and therefore improved penetration of greasy soil and/or particulated greasy soil to improve cleaning effectiveness, especially when applied neat to the surface to be treated. Hence, preferably, the liquid hard surface cleaning composition, comprising a thickener, has a viscosity of from 50 Pa·s to 650 Pa·s, more preferably 100 Pa·s to 550 Pa·s, most preferably 150 Pa·s to 450 Pa·s, at 20° C. when measured with a AD1000 Advanced Rheometer from Atlas® shear rate 10 s$^{-1}$ with a coned spindle of 40 mm with a cone angle 2° and a truncation of ±60 am.

Suitable thickeners include polyacrylate based polymers, preferably hydrophobically modified polyacrylate polymers; hydroxyl ethyl cellulose, preferably hydrophobically modified hydroxyl ethyl cellulose, xanthan gum, hydrogenated castor oil (HCO) and mixtures thereof.

Preferred thickeners are polyacrylate based polymers, preferably hydrophobically modified polyacrylate polymers. Preferably a water soluble copolymer based on main monomers acrylic acid, acrylic acid esters, vinyl acetate, methacrylic acid, acrylonitrile and mixtures thereof, more preferably copolymer is based on methacrylic acid and acrylic acid esters having appearance of milky, low viscous dispersion. Most preferred hydrologically modified polyacrylate polymer is Rheovis® AT 120, which is commercially available from BASF.

Other suitable thickeners are hydroxethylcelluloses (HM-HEC) preferably hydrophobically modified hydroxyethylcellulose. Suitable hydroxyethylcelluloses (HM-HEC) are commercially available from Aqualon/Hercules under the product name Polysurf 76® and W301 from 3V Sigma.

Xanthan gum is one suitable thickener used herein. Xanthan gum is a polysaccharide commonly used rheoligy modifier and stabilizer. Xanthan gum is produced by fermentation of glucose or sucroce by the *xanthomonas campestris* bacterium. Suitable Xanthan gum is commercially available under trade anem Kelzan T® from CP Kelco.

Hydrogenated castor oil is one suitable thickener used herein. Suitable hydrogenated castor oil is available under trade name THIXCIN R from Elementis.

The most preferred thickener used herein is a modified methacrylic acid/acrylic acid copolymer Rheovis® AT 120, which is commercially available from BASF.

When used, the liquid hard surface cleaning composition comprises from 0.1% to 10.0% by weight of the total composition of said thickener, preferably from 0.2% to 5.0%, more preferably from 0.2% to 2.5% and most preferably from 0.2% to 2.0%.

Chelating Agent:

The liquid hard surface cleaning composition can comprise a chelating agent or crystal growth inhibitor. Suitable chelating agents, in combination with the surfactant system, improve the shine benefit. Chelating agent can be incorporated into the compositions in amounts ranging from 0.05% to 5.0% by weight of the total composition, preferably from 0.1% to 3.0%, more preferably from 0.2% to 2.0% and most preferably from 0.2% to 0.4%.

Suitable phosphonate chelating agents include ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agent to be used herein is diethylene triamine penta methylene phosphonate (DTPMP). Such phosphonate chelating agents are commercially available from Monsanto under the trade name DEQUEST®.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename (S,S)EDDS® from Palmer Research Laboratories. Most preferred biodegradable chelating agent is L-glutamic acid N,N-diacetic acid (GLDA) commercially available under tradename Dissolvine 47S from Akzo Nobel.

Suitable amino carboxylates for use herein include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid or mixtures thereof.

Suitable fatty acids include the alkali salts of a $C_8$-$C_{24}$ fatty acid. Such alkali salts include the metal fully saturated salts like sodium, potassium and/or lithium salts as well as the ammonium and/or alkylammonium salts of fatty acids, preferably the sodium salt. Preferred fatty acids for use herein contain from 8 to 22, preferably from 8 to 20 and more preferably from 8 to 18 carbon atoms. Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB 1211.

Typically, the liquid hard surface cleaning composition may comprise up to 6.0% by weight of the total composition of said fatty acid, preferably from 0.1% to 3.0%, more preferably from 0.1% to 2.0% and most preferably from 0.15% to 1.5% by weight of the total composition of said fatty acid.

Typically, the liquid hard surface cleaning composition may comprise up to 2.0% by weight of the total composition of said branched fatty alcohol, preferably from 0.10% to 1.0%, more preferably from 0.1% to 0.8% and most preferably from 0.1% to 0.5%.

Perfumes:

The liquid hard surface cleaning compositions preferably comprise a perfume. Suitable perfumes provide an olfactory aesthetic benefit and/or mask any "chemical" odour that the product may have.

Method of Cleaning a Surface:

The liquid hard surface cleaning compositions of the present invention are particularly suitable for cleaning household surfaces. In particular, such compositions are particularly useful for improving surface shine, especially of hard surfaces.

For general cleaning, especially of floors, the preferred method of cleaning comprises the steps of:
  a) diluting the liquid hard surface cleaning composition to a dilution level of from 0.1% to 2% by volume, and
  b) applying the diluted composition to a hard surface.

In preferred embodiments, the liquid hard surface cleaning composition may be diluted to a level of from 0.3% to 1.5% by volume, or from 0.4% to 0.6% by volume.

The dilution level is expressed as a percent defined as the fraction of the liquid hard surface cleaning composition, by volume, with respect to the total amount of the diluted composition. For example, a dilution level of 5% by volume is equivalent to 50 ml of the liquid hard surface cleaning composition being diluted to form 1000 ml of diluted composition.

The diluted composition can be applied by any suitable means, including using a mop, sponge, or other suitable implement.

Alternatively, and especially for particularly dirty or greasy spots, the liquid hard surface cleaning compositions can be applied neat to the hard surface.

By "neat", it is to be understood that the liquid composition is applied directly onto the surface to be treated without undergoing any significant dilution, i.e., the liquid composition herein is applied onto the hard surface as described herein, either directly or via an implement such as a sponge, without first diluting the composition. By significant dilution, what is meant is that the composition is diluted by less than 10 wt %, preferably less than 5 wt %, more preferably less than 3 wt %. Such dilutions can arise from the use of damp implements to apply the composition to the hard surface, such as sponges which have been "squeezed" dry.

In a preferred embodiment of the present invention said hard surface is inclined or vertical. Inclined or vertical hard surfaces include mirrors, lavatory pans, urinals, drains, waste pipes and the like.

In another preferred embodiment of the present invention said method of cleaning a hard surface includes the steps of applying, preferably spraying, said liquid composition onto said hard surface, leaving said liquid composition to act onto said surface for a period of time to allow said composition to act, with or without applying mechanical action, and optionally removing said liquid composition, preferably removing said liquid composition by rinsing said hard surface with water and/or wiping said hard surface with an appropriate instrument, e.g., a sponge, a paper or cloth towel and the like.

The hard surface cleaning composition can be comprised on a wipe or pad. Such wipes and pads can be suitable for cleaning hard surfaces, such as found in the household, automotive surfaces such as car glass, and the like. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe. Methods for preparing thermally bonded fibrous materials are described in U.S. application Ser. No. 08/479,096 (Richards et al.), filed Jul. 3, 1995 (see especially pages 16-20) and U.S. Pat. No. 5,549,589 (Horney et al.), issued Aug. 27, 1996 (see especially Columns 9 to 10). Suitable pads include foams and the like, such as HIPE-derived hydrophilic, polymeric foam. Such foams and methods for their preparation are described in U.S. Pat. No. 5,550,167 (DesMarais), issued Aug. 27, 1996; and commonly assigned U.S. patent application Ser. No. 08/370,695 (Stone et al.), filed Jan. 10, 1995.

The compositions of the present invention can also be used for improving surface shine, since the beading of the composition results in less residue formation on the treated surface, and also greater removal of residues when the surface is wiped.

In addition, the copolymers of use in the compositions of the present invention, and the compositions themselves, may have some antimicrobial effect including reducing adhesion of microorganisms and/or for reducing the development of biofilm on a surface and/or for increasing ease of cleaning of a biofilm from a surface. These polymers, and the compositions comprising the polymers are used for cleaning benefits but have these secondary antimicrobial effects.

Methods:

A) pH Measurement:

The pH is measured on the neat composition, at 25° C., using a Sartarius PT-10P pH meter with gel-filled probe (such as the Toledo probe, part number 52 000 100), calibrated according to the instructions manual.

B) Lime-Scale Spotting:

Standard microscope slides (Gold Seal Rite-On Cat#3050, available from Thermo Fisher Scientific) were dipped into the test composition up to the label portion of the slide. The slide was removed and the excess test composition was allowed to drain back into the container. The slides were then left in a horizontal position to dry for 16 hours at 24° C.

In order to mimic lime-scale deposition during showering, the following procedure was used: Using a spray bottle, the microscope slides were sprayed with hard water (3.08 mmol/l or 18.1 gpg) at 40° C., holding the bottle 23 cm away from the slide and spraying 7 times (1.5 ml of liquid per spray).

The slides were then sprayed an additional 3 times with hard water, as described above, and the microscope slide dried overnight.

The spray cycle was repeated 7 times, drying between each cycle.

The degree of lime-scale spotting was measured using an image analysis system to count spots having a size greater than 2 mm in any direction.

C) Soap-Scum Spotting:

Standard microscope slides (Gold Seal Rite-On Cat#3050, available from Thermo Fisher Scientific) were dipped into the test composition up to the label portion of the slide. The slide was removed and the excess test composition was allowed to drain back into the container. The slides were then left in a horizontal position to dry for 16 hours at 24° C.

In order to mimic soap-scum (combination of soap and limescale) deposition during showering, the following procedure was used:

Using a spray bottle, the microscope slides were sprayed with hard water (3.08 mmol/l or 18 gpg) at 40° C., holding the bottle 23 cm away from the slide and spraying 3 times (1.5 ml of liquid per spray).

A soap-scum suspension was prepared as follows: 10 g of Dial™ bar soap was hydrated using 90 g of demineralized water over night, before mixing well in order to ensure a uniform dispersion. 0.5 g of this dispersion was then dispersed in 49.5 g of demineralized water (18 M-Ohm) before the mixture was added to 450 g of hard water (3.08 mmol/l or 18 gpg) in order to form the soap scum in-situ. The soap-scum preparation was sprayed onto the microscope slide 3 times (1.5 ml liquid per spray).

The slides were then sprayed an additional 3 times with hard water, as described above, and the microscope slide dried overnight.

The hard water/soap-scum/hard water spray cycle was repeated 14 times, drying between each cycle.

The degree of soap scum spotting was measured using an image analysis system to count spots having a size greater than 2 mm in any direction.

D) Grease Cleaning:

Partially cross-linked soy-bean grease was prepared by sparging air for 12 hours through food-grade, non-winterized, soybean oil kept at a temperature of 204° C.

A 12" by 12" (304.8 mm×304.8 mm) mirror was cleaned using 3 wt % of propylene glycol n-butyl ether in water, before air-drying at room temperature.

A 4" by 4" (101.6 mm×101.6 mm) mask was prepared using 4.5 mils Mylar™ (0.11 mm thick). The mask was applied to the mirror and the partially cross-linked soy-bean grease was applied to the mirror using a saturated foam-roll, such that 185 mg+/−2 mg of the grease was applied within the mask. The grease was allowed to set for 20 minutes before starting the cleaning process.

A paper towel (Bounty™ 2-ply) was weighed and folded in two. The paper towel was then attached to the lower surface of a cleaning implement having a weight of 1 Kg. In order to mimic cleaning by hand, the lower surface of the cleaning implement comprised 4 ribs of height 15.8 mm, width of 15.8 mm, and length 111 mm, wherein the top of the ribs was rounded (with a radius of 7.9 mm), with a distance of 9.55 mm between the ribs.

2.6 to 3.0 ml of the test composition was sprayed onto the masked area of the mirror. The mirror surface was then wiped in a horizontal action 6 times before wiping in a vertical action 6 times. The paper towel was removed from the implement and dried overnight at ambient temperature before reweighing to measure the grease pick-up.

The test was repeated 4 times and the results averaged.

EXAMPLES

Non-Limiting Synthesis Example for Polymers Suitable for Use in the Compositions of the Present Invention:

An example of a hydrophobically modified cationic polymer of use in compositions of the present invention is made as follows. Into a reaction vessel, place the monomers: N,N, dimethyl acryl amide (NDMAAM N, N-dimethylacrylamide available from Aldrich, n-octadecyl acrylamide (ODAA available from Polysciences), dimethyl aminopropylmethacrylamide (DMAPMA available from Aldrich), N-2-ethylhexyl acrylamide available from Aurora Fine Chemicals, LLC, (San Diego, Calif., 92126) and N-dodecyl acrylamide available from TCI, 1K polydimethylsiloxane (PDMS available from Gelest, as cat no. MCR-M11) and 10K PDMS (available from Gelest as cat no. MCR-M22) and solvent (ethyl acetate available from EMD Chemicals is used as the solvent for all the samples) in the amounts listed in Table 1 below.

The reaction vessel is closed and heated to the temperature (Reaction Temp ° C.) also listed in Table 1 below. Once at temperature, the reaction vessel is opened and the contents are sparged with an inert gas, such as but not limited to nitrogen or argon, for approximately four minutes utilizing a fritted gas dispersion tube. During the sparge, a free radical initiator V-67 (2,2'-azobis(2-methylbutyronitrile) available from DuPont) or V-70 (2,2'-azobis(2,4-dimethyl-4-methoxyvaleronitrile) available from Wako) is added to the reaction vessel. Except for Sample 2, the free radical initiator used is V-67. Sample 2's free radical initiator is V-70. The amount of free radical initiator is set forth in Table 1 below. The free radical initiator is added at approximately ½ sparge time to ensure the free radical initiator also undergoes some sparge. The contents are then sealed and kept at the temperature previously listed in Table 1 below for a time also listed in Table 1 below. After the elapsed time (Reaction Time) has transpired, the resulting polymer solution is cooled to 23° C.±2.2° C. then precipitated in a co-solution of ethyl acetate and hexanes from 40% to 80% ethyl acetate, such as 50% ethyl acetate and 50% hexane by volume. The precipitate is isolated from the solvent mixture and dried. Once dried the product can be used as is or can be dissolved in solvent system of choice per application. The solvent may be water. The reaction is completed such that less than 100 ppm of the monomers remain unreacted. The weight average molecular weight of the resultant polymers was from 100,000 to 500,000 Daltons.

TABLE 1

Monomer levels and reaction variables to produce the polymers of use in the present invention.

| Polymer | Monomer 1 | Monomer 1 (g) | Monomer 2 | Monomer 2 (g) | Monomer 3 | Monomer 3 (g) | Monomer 4 | Monomer 4 (g) | Solvent (g) | Initiator (g) | T ° C. | Rxn Time (hours) |
|---|---|---|---|---|---|---|---|---|---|---|---|---|
| 1* | NDMAAM[1] | 9.91 | ODAA[2] | 0.11 | DMAPMA[5] | — | — | — | 50 | 0.2 | 60 | 24 |
| 2 | NDMAAM[1] | 9.9 | ODAA[2] | 0.1 | DMAPMA[5] | 0.2 | — | — | 50 | 0.2 | 60 | 24 |
| 3 | NDMAAM[1] | 9.9 | ODAA[2] | 0.1 | DMAPMA[5] | 0.5 | — | — | 50 | 0.2 | 60 | 24 |
| 4 | NDMAAM[1] | 9.9 | ODAA[2] | 0.1 | DMAPMA[5] | 1.0 | — | — | 50 | 0.2 | 60 | 24 |
| 5 | NDMAAM[1] | 9.3 | ODAA[2] | 0.55 | DMAPMA[5] | 0.2 | — | — | 50 | 0.2 | 60 | 24 |
| 6 | NDMAAM[1] | 44 | ODAA[2] | 1 | DMAPMA[5] | 2.5 | 1K PDMS[6] | 2.5 | 250 | 1 | 60 | 70 |
| 7 | NDMAAM[1] | 38 | ODAA[2] | 2 | DMAPMA[5] | 5 | 10K PDMS[7] | 5 | 250 | 1 | 60 | 53 |
| 8 | NDMAAM[1] | 44 | C12[4] | 1 | DMAPMA[5] | 2.5 | 1K PDMS[6] | 2.5 | 250 | 1 | 60 | 24 |
| 9 | NDMAAM[1] | 37.5 | C12[4] | 2.5 | DMAPMA[5] | 5 | 10K PDMS[7] | 5 | 250 | 1 | 60 | 24 |
| 10 | NDMAAM[1] | 36 | ODAA[2] | 0.5 | DMAPMA[5] | 13.5 | — | — | 250 | 1 | 60 | 53 |
| 11 | NDMAAM[1] | 31.5 | ODAA[2] | 12.5 | DMAPMA[5] | 6 | — | — | 250 | 1 | 60 | 24 |
| 12 | NDMAAM[1] | 30 | ODAA[2] | 1 | DMAPMA[5] | 2 | 1K PDMS[6] | 20 | 250 | 1 | 60 | 24 |

*for use in comparative compositions
[1]N,N, dimethyl acryl amide
[2]n-octadecyl acrylamide
[3]C8 is N-2-ethylhexyl acrylamide
[4]C12 is N-dodecyl acrylamide
[5]dimethyl aminopropylmethacrylamide
[6]polydimethylsiloxane of molecular weight 1,000 Da
[7]polydimethylsiloxane of molecular weight 10,000 Da

TABLE 2

The resultant polymers had the following molar percentage composition:

| Polymer | Monomer 1 | Mol % | Monomer 2 | Mol % | Monomer 3 | Mol % | Monomer 4 | Mol % |
|---|---|---|---|---|---|---|---|---|
| 1* | NDMAAM[1] | 99.67 | ODAA[2] | 0.33 | DMAPMA[5] | 0 | — | — |
| 2 | NDMAAM[1] | 98.43 | ODAA[2] | 0.31 | DMAPMA[5] | 1.26 | — | — |
| 3 | NDMAAM[1] | 96.60 | ODAA[2] | 0.30 | DMAPMA[5] | 3.10 | — | — |
| 4 | NDMAAM[1] | 93.70 | ODAA[2] | 0.29 | DMAPMA[5] | 6.01 | — | — |
| 5 | NDMAAM[1] | 96.91 | ODAA[2] | 1.77 | DMAPMA[5] | 1.32 | — | — |
| 6 | NDMAAM[1] | 95.36 | ODAA[2] | 0.67 | DMAPMA[5] | 3.44 | 1K PDMS[6] | 0.54 |
| 7 | NDMAAM[1] | 90.82 | ODAA[2] | 1.47 | DMAPMA[5] | 7.58 | 10K PDMS[7] | 0.12 |
| 8 | NDMAAM[1] | 95.36 | C12[4] | 0.67 | DMAPMA[5] | 3.44 | 1K PDMS[6] | 0.54 |
| 9 | NDMAAM[1] | 90.38 | C12[4] | 1.86 | DMAPMA[5] | 7.65 | 10K PDMS[7] | 0.12 |

*for use in comparative compositions

TABLE 3

The following hard surface cleaning compositions were prepared, and evaluated for both soap-scum spotting and grease cleaning efficacy:

| | Ex 1 wt % | Ex 2 wt % | Ex 4 wt % | Ex 4 wt % | Ex A* wt % | Ex B* wt % |
|---|---|---|---|---|---|---|
| Water | 24.95 | 24.95 | 24.95 | 24.95 | 24.95 | 24.95 |
| ethanol | 75 | 75 | 75 | 75 | 75 | 75 |
| Polymer 2 | 0.05 | — | — | — | — | — |
| Polymer 3 | — | 0.05 | — | — | — | — |
| Polymer 4 | — | — | 0.05 | — | — | — |
| Polymer 5 | — | — | — | 0.05 | — | — |
| Polymer 1* | — | — | — | — | 0.05 | — |
| Gafquat 734[8] | — | — | — | — | — | 0.05 |
| Soap-scum spotting (number of spots after 14 cycles) | 12 | 9 | 9 | 12 | 16 | 17 |
| Grease-cleaning (mg) | 99.25 | — | — | 109.5 | 91 | 67 |

*comparative
[8]Quaternized vinylpyrrolidone/dimethylaminoethyl methacrylamide copolymer, available from Ashland Chemicals.

As can be seen from the data above, the hard surface cleaning compositions of the present invention provide reduced soap-scum spotting and improved grease cleaning.

The following compositions were prepared by mixing the following ingredients at the required levels:

| | Ex 5 wt % | Ex 6 wt % | Ex 7 wt % | Ex 8 wt % | Ex 9 wt % | Ex C* wt % | Ex D* wt % |
|---|---|---|---|---|---|---|---|
| C11 EO9 alcohol ethoxylate | 0.0125 | 0.0125 | 0.0125 | | 0.0125 | 0.0125 | |
| C12-14 Amine Oxide | 0.0125 | 0.0125 | 0.0125 | | 0.0125 | 0.0125 | |
| Perfume | 0.03 | 0.03 | 0.03 | | 0.03 | 0.03 | |
| Colorant | 0.003 | 0.003 | 0.003 | | 0.003 | 0.003 | |
| Propylene glycol n-butyl ether | 3 | 0.5 | 0.5 | 0.5 | 0.5 | 0.5 | 0.5 |
| Citric Acid | 2 | 2 | 2 | — | — | 2 | — |
| Xanthan gum | 0.3 | 0.3 | 0.3 | | 0.3 | 0.3 | |
| Preservative | 0.01 | 0.01 | 0.01 | | 0.01 | 0.01 | |
| Polymer 2 | | 0.1 | | | | | |
| Polymer 5 | 0.1 | 0.4 | 0.1 | .01 | 0.1 | | |
| GAFQuat 734[8] | | | | | | 0.1 | 0.1 |
| Water | To 100% | To 100% | To 100% | To 100% | To 100% | To 100% | To 100% |
| pH | 2.2 | 2.2 | 2.0 | 8.7 | 9.5 | 2.0 | 7 |
| Limescale spotting (number of spots after 7 cycles) | 12 | 5 | 2 | 9 | 6 | 34 | 45 |

As can be seen from the data above, the hard surface cleaning compositions of the present invention (Examples 5 to 9) provide reduced limescale spotting, in comparison to the comparative examples (C and D).

The following are non-limiting examples of the present invention:

| Ingredients (wt %) | I | II | III | IV | V | VI | VII |
|---|---|---|---|---|---|---|---|
| Polymer 5 | 0.5 | 0.1 | 0.1 | 0.1 | 0.1 | 0.1 | 0.4 |
| Polymer 2 | — | — | — | — | — | — | 0.1 |
| propylene glycol n-butyl ether | 3 | 0.5 | 3 | 0.5 | 0.5 | 3 | 0.5 |
| Citric Acid | 2 | — | — | — | — | 2 | 2 |
| Linear alcohol (C11) ethoxylate, POE-9[9] | — | — | — | 0.025 | 0.025 | 0.0125 | 0.0125 |
| C12-14 Amine Oxide | — | — | — | — | — | 0.0125 | 0.0125 |
| Perfume | 0.03 | 0.03 | 0.03 | 0.03 | 0.03 | 0.03 | 0.03 |
| Colorant | — | — | — | 0.003 | 0.003 | 0.003 | 0.003 |
| To pH (using Formic Acid) | — | — | — | — | — | 3 | 3 |
| Xanthan gum | — | — | — | — | — | 0.3 | 0.3 |
| Preservative | 0.01 | 0.01 | 0.01 | 0.01 | 0.01 | 0.01 | 0.01 |
| Water | QS | QS | QS | QS | QS | QS | QS |

[9]Biosoft N1-9, supplied by Stepan

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hard surface cleaning composition comprising:
   (a) A hydrophobically modified cationic polymer having the formula:

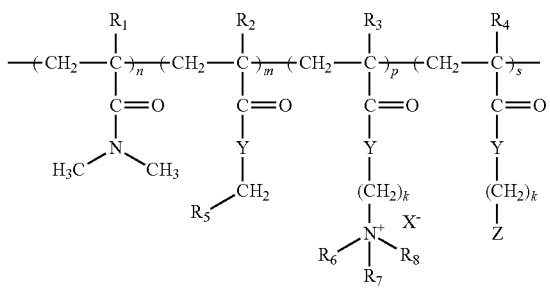

wherein:
   n, m, p, and s are the mole percent of the respective monomers, such that:
   n is from about 80 to about 99.5;
   m is from about 0 to about 10;
   p is from about 0.25 to about 20;
   s is from about 0 to about 10;
   m+s is at least about 0.01;
   with the proviso that the sum of the mole percentages add up to 100%;
   $R_1$, $R_2$, $R_3$, and $R_4$ are independently H or $CH_3$;
   $R_5$ is an alkyl group from C7 to C21;
   $R_6$, $R_7$, $R_8$, are independently selected from the group consisting of: hydrogen and C1 to C4 alkyl;
   Y is independently O or NH;
   Z is silicone or a derivative thereof;
   k is independently from about 1 to about 18;
   $X^-$ is an anion, preferably $Cl^-$, $Br^-$, $I^-$, $HSO_4^-$, $CH_3SO_4^-$, $C_2H_5SO_4^-$, or $OH^-$;
   and
   (b) a detersive surfactant, solvent, or mixtures thereof.

2. The hard surface cleaning composition according to claim 1, wherein the hydrophobically modified cationic polymer has a molecular weight of less than about 1,500,000 Daltons.

3. The hard surface cleaning composition according to claim 1, wherein in the hydrophobically modified cationic polymer, n is from about 85 to about 97.

4. The hard surface cleaning composition according to claim 1, wherein in the hydrophobically modified cationic polymer, m is from about 0.25 to about 7.

5. The hard surface cleaning composition according to claim 1, wherein in the hydrophobically modified cationic polymer, p is from about 0.5 to about 15.

6. The hard surface cleaning composition according to claim 1, wherein in the hydrophobically modified cationic polymer, s is from about 0.01 to about 1.

7. The hard surface cleaning composition according to claim 1, wherein in the hydrophobically modified cationic polymer, s is about 0.

8. The hard surface cleaning composition according to claim 1, wherein in the hydrophobically modified cationic polymer, $R_5$ is an alkyl group from C16 to C20.

9. The hard surface cleaning composition according to claim 1, wherein in the hydrophobically modified cationic polymer, $R_5$ is alkyl group C18.

10. The hard surface cleaning composition according to claim 1, wherein in the hydrophobically modified cationic polymer, $R_6$ is H, and $R_7$, $R_8$, are independently selected from the group consisting of: methyl, ethyl, and propyl.

11. The hard surface cleaning composition according to claim 1, wherein in the hydrophobically modified cationic polymer, Z is a silicone or derivative selected from the group consisting of a polydimethylsiloxane, an aminosilicone, a cationic silicone, a silicone polyether, a cyclic silicone, a fluorinated silicone and mixtures thereof.

12. The hard surface cleaning composition according to claim 1, wherein in the hydrophobically modified cationic polymer, Z is a polydimethylsiloxane.

13. The hard surface cleaning composition according to claim 11, wherein Z is a silicone or derivative having a molecular weight of from about 250 to about 40,000 Da.

14. The hard surface cleaning composition according to claim 1, wherein the composition comprises detersive surfactant selected from the group consisting of: anionic surfactant, nonionic surfactant, and mixtures thereof, at a level of from about 0.00025 wt % to about 15 wt % of the hard surface cleaning composition.

15. The hard surface cleaning composition according to claim 1, wherein the hard surface cleaning composition comprises solvent, at a level of from about 0.005 wt % to about 10 wt % by weight of the total composition of said solvent.

16. A wipe or pad comprising the hard surface cleaning composition according to claim 1.

17. The use of hard surface cleaning composition according to claim 1 for:
   (a) reducing grease attachment on hard surfaces;
   (b) preventing soap-scum spotting on hard surfaces;
   (c) for reducing adhesion of microorganisms and/or for reducing the development of biofilm on a surface and/or for increasing ease of cleaning of a biofilm from a surface; and
   (d) combinations thereof.

* * * * *